Aug. 7, 1962   M. MELZER   3,048,033
HYDRAULIC LOAD-TESTING APPARATUS
Filed Nov. 12, 1959   2 Sheets-Sheet 1
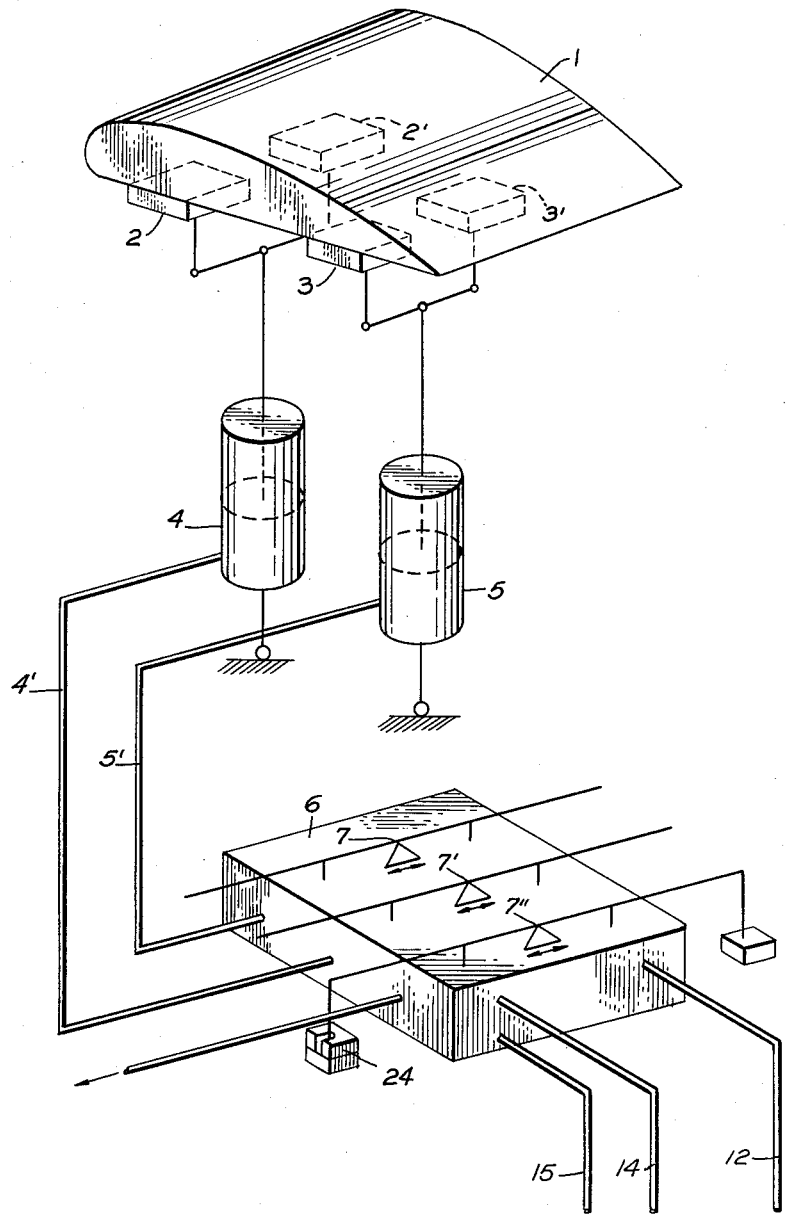
INVENTOR.
Manfred Melzer
BY
Jones, Darbo & Robertson
ATTYS.

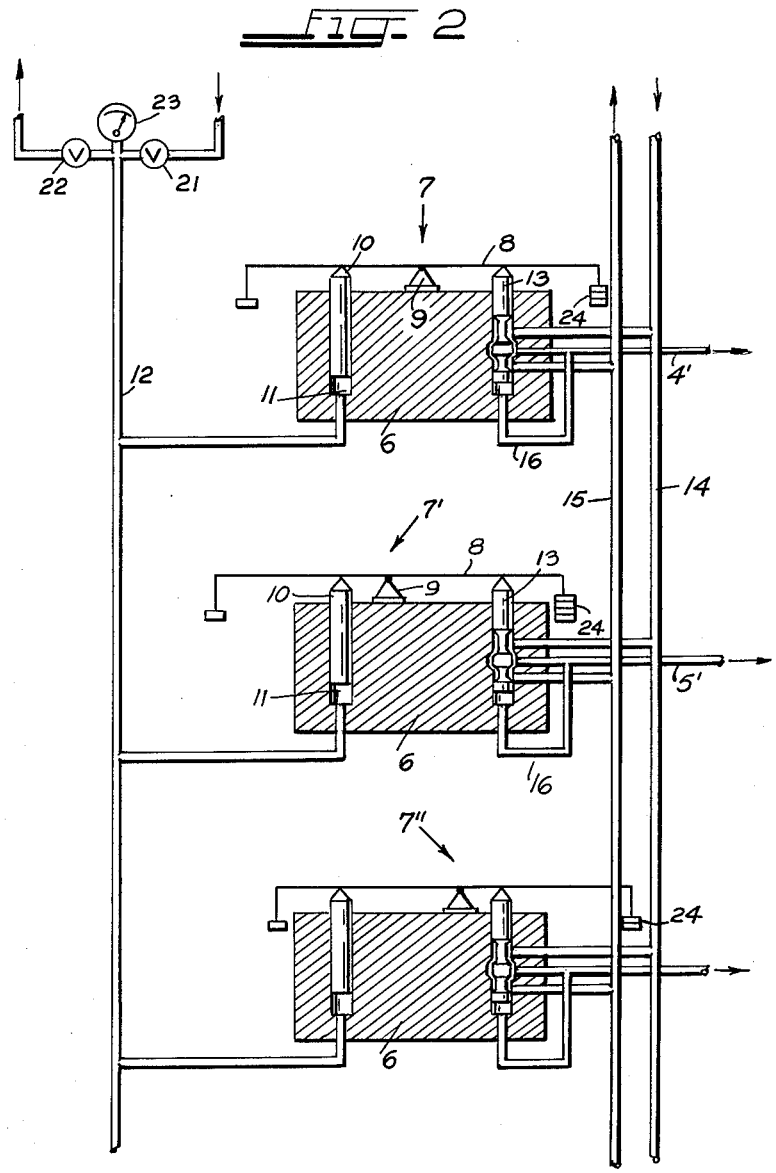

United States Patent Office 3,048,033
Patented Aug. 7, 1962

3,048,033
HYDRAULIC LOAD-TESTING APPARATUS
Manfred Melzer, Bremen, Germany, assignor to Losenhausenwerk, Dusseldorfer Maschinenbau A.G., Dusseldorf-Grafenberg, Germany
Filed Nov. 12, 1959, Ser. No. 852,461
Claims priority, application Germany Nov. 14, 1958
4 Claims. (Cl. 73—88)

In the testing of large structural parts, such as aircraft wings, it is necessary to load the structural part, at a number of points at the same time, with different forces which are at a definite ratio to one another. In such testing installations heretofore, the forces have been produced by means of separate hydraulic testing cylinders each having a pressure-regulating device. However, considerable difficulties are involved in making provisions for adjusting the values of the individual pressure regulators from a central station and for ensuring a simultaneous loading of the structural part with different, accurately determined forces.

According to the present invention, each loading cylinder in such testing installations is controlled by a pressure-regulating device which may be called a pressure-balance and the various pressure-balances are all connected to a common controlling-pressure conduit, which controls them all, but each according to its own setting. With the controlling pressure kept constant, the individual testing cylinders are given different pressures which are at a predetermined relationship with one another and with the controlling pressure. The working pressures can, while accurately maintaining the pressure relationships, be easily varied from the station by adjusting the controlling pressure. Advantageously, such a pressure-balance includes a balance beam, which is subject to the pressure in the testing cylinder and also controls this pressure. On opposite sides of a fulcrum, which is shiftable, are a piston which is acted upon by the controlling pressure and, on the other hand, a piston which is acted upon by the testing-cylinder pressure. The balancing beam adjusts a valve to valve the testing cylinder pressure to make the pistons counteract each other. Pressure-balances are known per se and are inherently very suitable for such testing installations since they make possible a rated-value adjustment by displacement of the fulcrum of the balance beam and are very simple and reliable and ensure the necessary accuracy of the pressure relationship.

An example of embodiment of the invention is diagrammatically represented in FIGS. 1 and 2 and is hereinafter described.

FIG. 1 is a diagrammatic representation of the load-testing apparatus as applied to an airplane wing.

FIG. 2 is a diagrammatic representation of the hydraulic control portions of the system shown in FIG. 1.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The invention is shown as applied to an aircraft wing 1.

Loading members 2, 2' and 3, 3' are attached at different positions to the wing 1. By means of the loading members 2, 2' a different force is to be exerted on the aircraft wing 1 by the testing cylinder 4 than by the loading members 3, 3' operated by the testing cylinder 5. Since the testing cylinders 4 and 5 have the same diameter, it is necessary for different working pressures to be supplied to the testing cylinders 4 and 5 through the pipes 4' and 5'. The testing cylinders 4 and 5 and, if necessary, other testing cylinders (not shown) are connected for this purpose to a pressure-balance block 6, or a plurality of such blocks. We may assume there is one such block, in which a number of pressure balances 7, 7', 7" are fitted.

Each of these pressure balances, which are represented separately in FIG. 2, comprises a balance beam 8 which is mounted on an adjustable pedestal or fulcrum 9. Acting upon the balance beam 8 is a piston 10, the cylinder 11 of which is connected to a common controlling-pressure pipe 12, which may also be called the "control-pressure conduit." On the other side of the pedestal 9, and similarly bearing on the balance beam 8, is a controlling slide valve 13 which also acts as a piston. In the usual manner, a pressure pipe 14 and a return pipe 15 lead to valve 13. From the controlling slide valves 13, working-pressure pipes 4' and 5' lead to testing cylinders 4 and 5 respectively. In each case the working pressure is passed through a connecting pipe 16 (or a passage in the valve structure) to the space beneath the piston surface of the particular slide valve 13. Consequently, the working pressure is adjusted, until the balance beam 8 is in equilibrium due to the force exerted by the controlling pressure by means of the piston 10 and to the force exerted by the working pressure by means of the controlling slide valve 13.

The ratio of the controlling pressure to the working pressure may be different and delicately sensitive for each of the pressure balances 7, 7', 7". Each is adjusted accurately by shifting the pedestal or fulcrum 9. On an alteration of the controlling pressure, all the working pressures vary proportionally, except as noted below, especially in the next paragraph. The controlling pressure can be varied by valves 21 and 22, controlling supply and discharge. By observing gauge 23, the pressure may be set to any chosen value.

For balancing a constant load, for example the weight of the testing cylinders, additional weights 24 may be attached to one side of the balance beam 8. This provides a constant differential of pressure, which may be considered to be superimposed on the otherwise constant pressure ratios.

The pressure-balance block 6 may be arranged at a controlling station, so that the testing installation can be operated and adjusted at the station by one man.

In addition to the test loading cylinders controlled by pressure-balances, there could be one or more directly subject to pressure from control conduit 12. Likewise there could be one or more whose pressure regulator is governed only indirectly by the control pressure conduit 12, as by having its control pressure piston 10 activated by the work pressure derived from one of regulators 7, 7' or 7". In all of the systems thus described, the pressure-balances are used to maintain a predetermined relationship of all of the test loadings through being governed by a single fundamental control pressure which may be changed to correspondingly change all test loads simultaneously.

I claim:

1. A load-testing apparatus for use with fluid supply means, said apparatus including in combination: a plurality of testing cylinder means; a fluid pressure-balance means for each cylinder means, each said balance having two fluid devices acting thereon in opposition, each balance means being connected to said supply means and to the respective cylinder means to supply fluid to said cylinder means and one of said devices at a pressure which is a function of the setting of the balance means, each balance means including an adjustment to initially preset the relative strength of the devices as they act in opposition to each other; and a fluid control conduit connected to the other fluid device of each pressure-balance means; and means connected to said supply means and to said conduit to regulate the fluid pressure in said conduit to thereby simultaneously regulate the fluid pressure at each cylinder means.

2. A load-testing apparatus for use with a source of fluid pressure, said apparatus including in combination: a plurality of testing cylinder means; a pressure-balance for each cylinder means; a control pressure conduit; and means to vary the fluid pressure in said control pressure conduit; each pressure-balance including a balance beam, control valve means operatively connected to said beam, to be set by the position of the beam, connected to said source and connected to the respective cylinder means to supply fluid from said source to the cylinder means at a working pressure which is a function of the setting of said valve means, said valve means acting on said beam to pivot said beam in one direction by a force which is a function of said working pressure, a control cylinder means connected to said control pressure conduit and operatively connected to said beam to act on said beam to pivot said beam in the opposite direction by a force which is a function of the fluid pressure in said control pressure conduit, and means to preset the effect on said beam of the two opposed forces.

3. An apparatus as set forth in claim 2, wherein the means to preset the effect on said beam includes a fulcrum mounted between the point of operative connection of the valve means and the point of operative connection of the control cylinder means, said fulcrum being movable between said two points.

4. An apparatus as set forth in claim 3, wherein the pressure-balance includes adjustable weight means acting downwardly on the portion of the beam extending from said fulcrum away from the latter point.

References Cited in the file of this patent
UNITED STATES PATENTS

| | | |
|---|---|---|
| 2,505,887 | Edison | May 2, 1950 |
| 2,978,907 | Stover | Apr. 11, 1961 |